(12) United States Patent  
Mei

(10) Patent No.: US 6,331,923 B1  
(45) Date of Patent: *Dec. 18, 2001

(54) MICROACTUATED DISK DRIVE SUSPENSION WITH HEIGHTENED STROKE SENSITIVITY

(75) Inventor: Shijin Mei, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/778,271

(22) Filed: Feb. 6, 2001

Related U.S. Application Data

(63) Continuation of application No. 09/439,599, filed on Nov. 12, 1999, now Pat. No. 6,239,953.
(60) Provisional application No. 60/159,907, filed on Oct. 15, 1999.

(51) Int. Cl.$^7$ ................................................ G11B 5/56
(52) U.S. Cl. ................................ 360/294.4; 360/294.6
(58) Field of Search .............................. 360/294.4, 294.6

(56) References Cited

U.S. PATENT DOCUMENTS

| | | | |
|---|---|---|---|
| 5,189,578 | * 2/1993 | Mori et al. | 360/109 |
| 5,764,444 | * 6/1998 | Imamura et al. | 360/109 |
| 6,078,473 | * 6/2000 | Crane et al. | 360/294.6 |
| 6,134,087 | * 10/2000 | Khan et al. | 360/294.6 |

* cited by examiner

*Primary Examiner*—Robert S. Tupper  
(74) *Attorney, Agent, or Firm*—Louis J. Bachand

(57) ABSTRACT

A disk drive suspension comprising a load beam utilizing a piezoelectric microactuator has multiply reversely deflected arcuate spring portion elements that further curl or flatten in response to contraction or expansion of the piezoelectric microactuator to facilitate greater distance beam displacement at lower levels of voltage.

9 Claims, 3 Drawing Sheets

MICROACTUATED DISK DRIVE SUSPENSION WITH HEIGHTENED STROKE SENSITIVITY

REFERENCE TO RELATED APPLICATIONS

This application is continuation of U.S. patent application Ser. No. 09/439,599, filed Nov. 12, 1999, now U.S. Pat. No. 6,239,953 and further claims the benefit of U.S. Provisional Application, Serial No. 60/159,907, filed Oct. 15, 1999.

BACKGROUND OF THE INVENTION

1. Field of the Invention

This invention relates to disk drive suspensions and, more particularly, to load beams for disk drive suspensions displaced by microactuators and having features allowing greater stroke sensitivity (or displacement response to microactuator elongation and contraction) for increased distance of stroke without loss of torsion performance with a given voltage input. The invention suspensions utilize microactuation by a piezoelectric crystal to shift the load beam distal end relative to the beam base portion over the disk to be read. The invention uses plural reverse deflections (or turns of direction) along the length of the suspension spring elements to provide a softer resistance to lateral movement and less constraint of the suspension movement that is responsive to longitudinal dimensional change in the piezoelectric crystals, while maintaining the structural integrity of the suspension. Manufacturing advantages accrue from the inventive use of the plural reverse deflections over the use of single deflections. Single deflections tend to spring back and plural, reverse deflections counteract this tendency. The invention enables effective microactuation of suspensions with the use of greatly reduced voltages, e.g. 5 volts, rather than 40 volts heretofore employed by virtue of heightened stroke sensitivity. Stroke sensitivity, measured in NMNOLT, is increased, for example, to over 41 NMNOLT from the just about 31 NMNOLT obtained with single deflection in the suspension spring elements.

2. Related Art

Load beams are used to carry sliders containing read/write heads adjacent spinning disks. The load beam has a base portion anchored to an actuator arm that pivotally shifts the load beam and its associated slider angularly to move between tracks on the disk. The mass and inertia of conventional actuators means it requires considerable power to operate them.

SUMMARY OF THE INVENTION

It is an object of the present invention to provide an improved suspension. It is a further object to provide a load beam of novel design and a method of forming such load beams and suspensions. It is a further object to provide for the actuation of a suspension load beam with microactuators acting against a beam spring portion having an improved expansion and contraction capability. It is a further object to utilize piezoelectric crystals acting between the load beam base potion and the beam portion across the spring portion under voltages of less than about 40 volts to as little as 5 volts or less and to increase the stroke sensitivity of microactuated suspensions to greater than 40 NMNOLT. It is a still further object to provide a load beam having specially conformed spring elements bent from the plane of the load beam to be disposed vertically to the load beam to support the beam portion from the base portion and also to readily allow changes in dimension of the spring portion through the decrease or increase in repeating reversed arcuate sections of the spring elements.

The invention accordingly provides a disk drive suspension comprising a load beam having a base portion, a spring portion and a beam portion adapted to carry a slider in operating proximity to a disk, a dimensionally variable electrodynamic microactuator coupled to the base portion and the beam portion and across the spring portion in beam portion angularly displacing relation to the base portion over a distance that is a function of an applied voltage to the microactuator and the resistance of the spring portion to changes in dimension, the spring portion comprising a plurality of longitudinally extended, multiply reversely deflected spring elements providing low resistance change in spring portion dimensions, whereby the beam portion is displaced an increased distance at a given applied voltage.

In this and like embodiments, typically, the suspension includes right and left hand microactuators acting on the beam portion in displacing relation, the microactuator comprises a piezoelectric crystal, and the suspension has a stroke sensitivity above about 35 NMNOLT.

In a further embodiment, the invention provides a disk drive suspension comprising a load beam having a base portion, a spring portion and a beam portion adapted to carry a slider in operating proximity to a disk, a dimensionally variable piezoelectric crystal microactuator coupled to the base portion and the beam portion and across the spring portion in beam portion displacing relation to the base portion over a distance that is a function of an applied voltage to the microactuator and the resistance of the spring portion to changes in dimension, the spring portion comprising a plurality of longitudinally extended, multiply reversely deflected spring elements providing low resistance change in spring portion dimensions, whereby the beam portion is displaced an increased distance at a given applied voltage.

In this and like embodiments, typically, the spring portion comprises right and left spring elements, and the microactuator comprises right and left piezoelectric crystals coupled between the base and beam portions inboard of the right and left spring elements, the load beam spring portion extends in a plane, the spring portion having right and left side rails extending normal to the spring portion plane and defining respectively opposed right and left spring elements that extend laterally of the load beam, the spring elements being reversely deflected at spaced locations along their longitudinal extent to form spaced proximate and distal local arcuate sections, the sections extending parallel to the spring portion plane, the proximate arcuate sections open inwardly and are open toward each other across the spring portion, the distal arcuate sections open outwardly and are closed toward each other, and the spring elements converge on one another from their proximate ends to their distal ends.

Further, while the microactuators are typically bonded to the load beam, the invention contemplates a positive coupling of the load beam to the microactuators in lieu of or in addition to an adhesive bond. For this purpose, the microactuator and the load beam define cooperating inter fitting structures, the microactuator acting through the interfitting structures to displace the load beam.

The right and left piezoelectric crystals thus have proximate portions attached to the base portion and distal portions attached to the beam portion (includes a continuation of the spring portion attached to the beam portion), and intermediate portions between the proximate and distal portions, the arcuate sections being disposed opposite the crystal intermediate portions.

Typically, the arcuate sections are each deflected a like amount from their respective spring elements, the piezoelectric crystals each have outer edges, and the distal arcuate sections are closer to the crystal outer edges than the proximate arcuate sections, the suspension having a stroke sensitivity above about 35 NMNOLT.

In a further embodiment, the invention provides a center spring element as well as right and left spring elements. Thus, the invention in this embodiment provides a disk drive suspension comprising a load beam having a base portion, a spring portion and a beam portion adapted to carry a slider in operating proximity to a disk, a dimensionally variable piezoelectric crystal microactuator coupled to the base portion and the beam portion and across the spring portion in beam portion displacing relation to the base portion over a distance that is a function of an applied voltage to the microactuator and the resistance of the spring portion to changes in dimension, the spring portion comprising right, left, and central longitudinally extended, multiply reversely deflected spring elements providing low resistance change in spring portion dimensions, whereby the beam portion is displaced an increased distance at a given applied voltage.

In this and like embodiments, typically, the microactuator comprises right and left piezoelectric crystals coupled between the base and beam portions inboard of the right and left spring elements and on opposite sides of the central spring element, including by the aforementioned cooperating interfitting structures between the load beam and microactuator crystals.

The disk drive suspension load beam spring portion extends in a plane, the spring portion having right and left side rails extending normal to the spring portion plane and defining respectively the right and left spring elements that extend in opposed relation and laterally of the load beam, the spring portion further having a center part generally extending in the spring portion plane, the center part defining the central spring element extending normal to the spring portion plane and parallel to the right and left side rails, the right, left and central spring elements each being reversely deflected at spaced locations along their longitudinal extent to form spaced proximate and distal local arcuate sections, the distal arcuate sections being formed with the side rails in the spring portion plane and simultaneously, typically by a common forming tool, in a common direction from the spring portion, the side rails being subsequently turned normal to the plane. The proximate arcuate sections are similarly, and oppositely formed with the side rails in the spring portion plane and simultaneously in a common direction from the spring portion, the side rails again being subsequently turned normal to the plane.

The right and left proximate arcuate sections open inwardly and are open toward each other and the central spring element, while the distal arcuate sections open outwardly and are closed toward each other.

The disk drive suspension right and left piezoelectric crystals have proximate portions attached to the base portion and distal portions attached to the beam portion, and intermediate portions extending between the proximate and distal portions, the right piezoelectric crystal intermediate portion being located between and opposite the right arcuate sections and the central arcuate sections, the left piezoelectric crystal being located between and opposite the left arcuate sections and the central arcuate sections. The proximate and distal arcuate sections on the right, left and center spring elements are each deflected a like amount from their respective spring elements. As in previous embodiments, the suspension typically has a stroke sensitivity above about 35 NMNOLT.

In yet a further embodiment, the invention provides a disk drive suspension comprising a load beam having a base portion, a spring portion and a beam portion adapted to carry a slider in operating proximity to a disk, right and left dimensionally variable piezoelectric crystal microactuator coupled to the base portion and the beam portion and across the spring portion in beam portion angular displacing relation to the base portion over a distance that is a function of an applied voltage to the microactuator and the resistance of the spring portion to changes in dimension, the spring portion comprising right, left and central longitudinally extended, multiply reversely deflected spring elements bracketing the microactuators and providing low resistance change in spring portion dimensions, whereby the beam portion is displaced an increased distance at a given applied voltage.

In this and like embodiments, typically, the right, left and central spring elements each comprise a unitary part of a common web with the beam base portion and the beam portion, each spring element having fore and aft tabs connected to the beam and base portions respectively and distal arcuate sections connected to the fore tabs and proximate arcuate sections connected to the aft tabs in beam supporting relation relative to the base, the arcuate sections being deflected a like amount from their respective spring elements and substantially parallel to each other when the right and left spring elements are folded outward to be parallel to the plane of the spring portion. The arcuate sections tend to flatten to a greater radius curve when the spring element is elongated by action of the piezoelectric crystal and to curl to a lesser radius curve when the spring portion element is contracted by action of the piezoelectric crystal and individually for each of the arcuate section.

In its method aspects, the invention provides a method of forming a disk drive suspension comprising a load beam having a base portion, a spring portion and a beam portion adapted to carry a slider in operating proximity to a disk and a dimensionally variable piezoelectric crystal microactuator coupled to the base portion and the beam portion and across the spring portion in beam portion displacing relation to the base portion over a distance that is a function of an applied voltage to the microactuator and the resistance of the spring portion to changes in dimension, including providing right and left spring elements comprising coplanar right and left continued extents of the right and left edges respectively of the spring portion, deflecting oppositely the proximate and the distal portions of the spring elements from their common plane with the spring portion, and folding the spring elements at the respective edges of the spring portion to have the right and left spring elements normal to the spring portion and the deflections therein parallel to the spring portion for less resistance to increased distance change in spring portion dimensions at a given applied voltage.

The method further includes providing a central spring element between the right and left spring elements comprising a central part of the spring portion, and deflecting oppositely the proximate and distal portions of the central spring element from the plane of the spring portion simultaneously with the deflection of the right and left spring elements to have the central spring element and the deflections therein normal to the spring portion, and attaching right and left piezoelectric crystals across the spring portion between the central spring element and the right and left spring elements respectively with adhesive and/or through cooperating interfitting structures on the piezoelectric crystals and the load beam, whereby the crystals are attached to the load beam.

BRIEF DESCRIPTION OF THE DRAWINGS

The invention will be further described as to certain illustrative embodiments in conjunction with the attached drawings in which.

DETAILED DESCRIPTION

Figure 1:
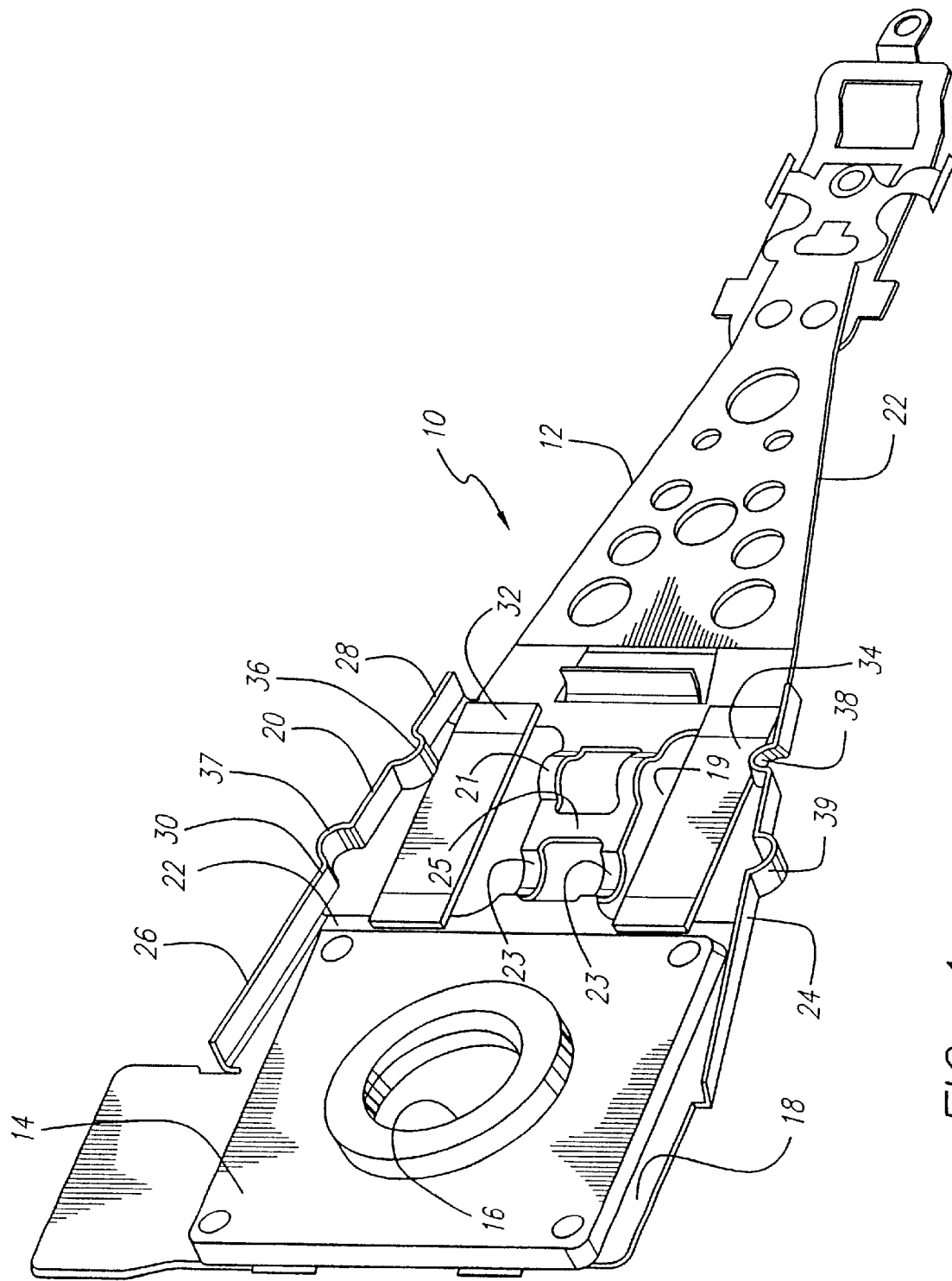
FIG. 1 is an oblique view of the invention suspension.

The invention uses piezoelectric crystal material as a microactuator in a data recording head suspension. Conventional servo actuation is not effective when the disks have a high density of tracks-per-inch (TPI) such as about 25 to 30 KTPI since they are no longer able to follow the tracks for magnetic reading and writing. Further, the mass and inertia of the conventional actuator system requires considerable power to operate. In the invention the piezoelectric crystal is used as a microactuator variable member (motor) after being fastened to the base portion and the beam portion of the load beam, across the spring portion.

To increase the response of the suspension to microactuation, particularly at low applied voltages, it is desirable to increase the stroke sensitivity, or distance of displacement per volt. Measured as nanometers/volt, the stroke sensitivity in the present invention can exceed 40 NMNOLT. It has been found that the present invention using a reversely deflected spring element is far more effective than using a single deflection in the spring element. The deflections should be opposed and plural, forming a sinusoidal pattern, possibly separated by intervening lands of undeflected spring element between the deflections. The requirement is that there be at least two oppositely extending deflections that will preferentially yield to bending forces imposed on the load beam spring portion by the microactuators, so that the planar, undeflected parts of the spring portion do not have to yield to obtain movement in the spring portion and commensurate displacement of the beam portion and the slider over the disk tracks. Multiple deflections, even corrugations, of the spring elements can be used to achieve the ease of movement sought in the spring portion and enable sufficient movement with ever decreasing amounts of applied voltage.

With all the improvements in stroke sensitivity there cannot be a decrease in the torsion performance characteristic of the suspension. A suspension having a single deflection in its spring elements and a stroke sensitivity of about 30 NMNOLT and a $1^{st}$ torsion value of 6000 Hz, can be improved by adding a second reversely directed deflection to each spring element in accordance with the invention to obtain a stroke sensitivity of over 40 NMNOLT while also obtaining a $1^{st}$ torsion value of 6400 Hz.

The invention introduces dimensional flexibility to the load beam spring portion without reducing or altering its spring portion effectiveness by fabricating the spring portion elements to have reversely deflected arcuate sections. These sections while they support the load beam beam portion just as a conventional spring portion have the capability, separately and independently, to flatten or curl under elongating or contracting loads imposed by the crystal element mounted to the load beam.

The invention uses a plurality of spring portion elements, typically two or three, each with a "double C-shape", that is two or more arcuate or "C-shaped" sections are defined along the length of each spring element, and oppositely. The radius of the spring element arcuate sections can vary depending on the specific structure; their location is on either side of piezoelectric element in the load beam spring area. The arcuate section offers less constraint than that of flat, noncurved designs. With the elongation and compression of the piezoelectric element, the arcuate sections provide a physical conformation for the spring elements to extend or compress. With a small excitation force from the piezoelectric element, there is reconformation in the off-plane arcuate figures with less stress that involved in reshaping a conventional spring portion.

The orientation of the arcuate sections can range from vertical to the load beam to lateral of the load beam, that is from 90° to 0° relative to the plane of the load beam, but are preferred for manufacturing reasons and performance reasons to be oriented normal to the plane of the load beam spring portion.

Figure 2:
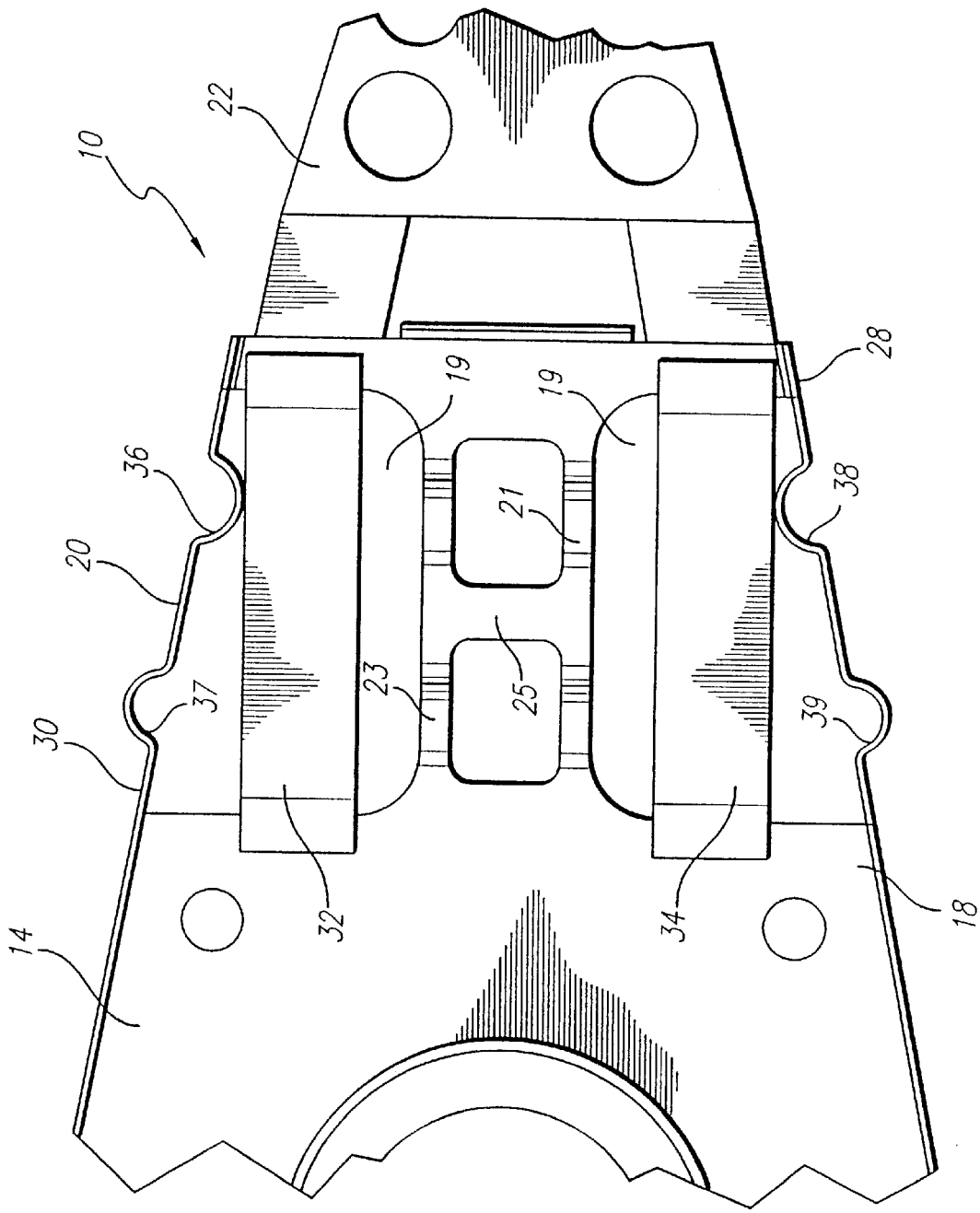
FIG. 2 is top plan view thereof.

With reference now to the drawings in detail, in FIGS. 1 and 2 load beam 10 comprises a unitary web 12 of stainless steel or other suitable spring material supported by a mount plate 14 having a boss 16. Load beam 10 has a base portion 18, fixed on the mount plate boss 16, a spring portion 20 and a beam portion 22 for carrying a slider (not shown). Electrodynamic microactuators in the form of piezoelectric crystals 32, 34 are bonded to the base portion 18 and the beam portion 22 with glue or by other means. The crystals 32, 34 are arranged to traverse the openings 19 in the spring portion 20 at a desired angle relative to the longitudinal axis of the load beam 10. Crystals 32, 34 function independently to elongate or contract in response to a positive or negative voltage being applied, exerting a force on the immovable base portion 18 and the displaceable beam portion 22. The beam portion 22 is displaced in the Y-axis a distance that is a function of the applied voltage and the mechanical resistance of the beam spring portion 20 to bending to accommodate the beam portion displacement.

Spring portion 20 comprises left and right hand spring elements 24, 26. Spring elements 24, 26 are unitary with the web 12 and formed to have forward and rearward tabs 28, 30, and distal arcuate sections 36, 38 and proximate arcuate sections 37, 39 intermediate the length of the spring elements and connected to the base portion 18 and beam portion 22 by their respective tabs 28, 30. The arcuate sections 36, 37, 38 and 39 are generally C-shaped, extend reversely on each spring element 24, 26 and are disposed normal to the lateral plane of the spring portion 20. Proximate arcuate sections 37, 39 are open to that plane, see FIG. 1, whereas arcuate sections 36, 38 are closed to that plane.

Thusly conformed, the spring elements 24, 26 will lengthen or contract in response to relative movement between the base portion 18 and the beam portion 22. This accommodation of relative movement is the product of the radius of curvature of the arcuate spring sections 36, 37, 38 and 39 changing. A displacement of the beam portion 22 by the elongation of the piezoelectric crystals 32, 34 will extend or contract the spring elements 24, 26 by changing their arcuate sections 36, 37, 38 and 39 radius of curvature to larger (flatter) for an elongation of the crystals, or smaller (more curled) for a contraction of the crystals.

The change in curvature of the arcuate sections 36, 37, 38 and 39 of spring elements 24, 26 makes changes in the apparent length of these elements (measured as the distance between the base portion 18 and the beam portion 22 at the elements, as opposed to real length which is the length from end-to-end) a simple, nearly mechanical resistance-free step, in contrast to the forcing of real length changes in the spring portion. The FIG. 1 and 2 embodiment simply changes the curvature of the arcuate sections 36, 37, 38 and 39 without acting against the tensile strength of the metal web 12.

With further reference to FIGS. 1 and 2, the suspension load beam has a third spring element 25. Thus, load beam spring portion 20 comprises three spring elements: 24, 25 and 26, with the added spring element 25 being central to the load beam, disposed along the longitudinal axis thereof and between the left and right hand spring elements 24, 26. Central spring element 25 is reversely deflected to form two oppositely arcuate sections, distal arcuate section 21 and proximate arcuate portion 23.

The load beam spring portion 20 is formed with the load beam web 12 in a flat condition. The forming tool (not shown) that forms right and left hand spring elements 24, 26 into reversely paired arcuate sections 36, 37, 38 and 39 preferably also forms the spring element 25 into both its distal and proximate arcuate sections 21 and 23. The spring elements 24, 26 are later folded to be at a right angle to the lateral plane of the remainder of the spring portion 20. The central distal and proximate arcuate sections 21 and 23 are in parallel with the distal and proximate arcuate sections 36, 37, 38 and 39 in outboard spring elements 24, 26 while the web 12 is flat, and thereafter in planes normal to the planes of the outboard spring element arcuate sections.

The functioning of the spring elements 24, 25 and 26 is as just described. Arcuate sections 36, 37, 38, 39, 21 and 23 flex and change in curvature to accommodate displacement of the beam portion 22 by the dimensionally variable piezoelectric crystals 32, 34.

The spring elements 24, 26 lie in a common plane that includes the load beam base 18 and beam or rigid portion 22. Arcuate sections 36, 37, 38, 39, 21 and 23 are typically of like extent of deflection and have a like curvature. The illustrated embodiment in which the spring elements are normal to the plane of the web 12 is advantageous in enabling the suspension to be stiffer in the vertical direction and the same or less stiff in the sway direction. The piezoelectric crystal functions better when pushing against something that is not so stiffly resisting. Also, bending of the suspension in the areas of piezoelectric crystal attachment can cause breakage or detachment of the crystal due to the tremendous mechanical advantage between the beam distal end where the load is applied and the beam proximate end acting as a fulcrum near the mount plate. The crystal area is about one-fifth to one-eighth of the beam distance, so it sees a force of 5 to 8 times the load. This force is resisted by the crystal in bending and shear, and the crystal is stressed to either break or shear its adhesive bond to the beam. Stiffening the beam in the crystal area will reduce or eliminate this phenomenon. The laterally disposed spring elements 24, 26 are formed as rails opposite the crystal mounting, thereby stiffening the beam in this area. The beam then tends to bend in the spring area, as intended, rather than in the crystal area where bending is not wanted.

Figure 3:
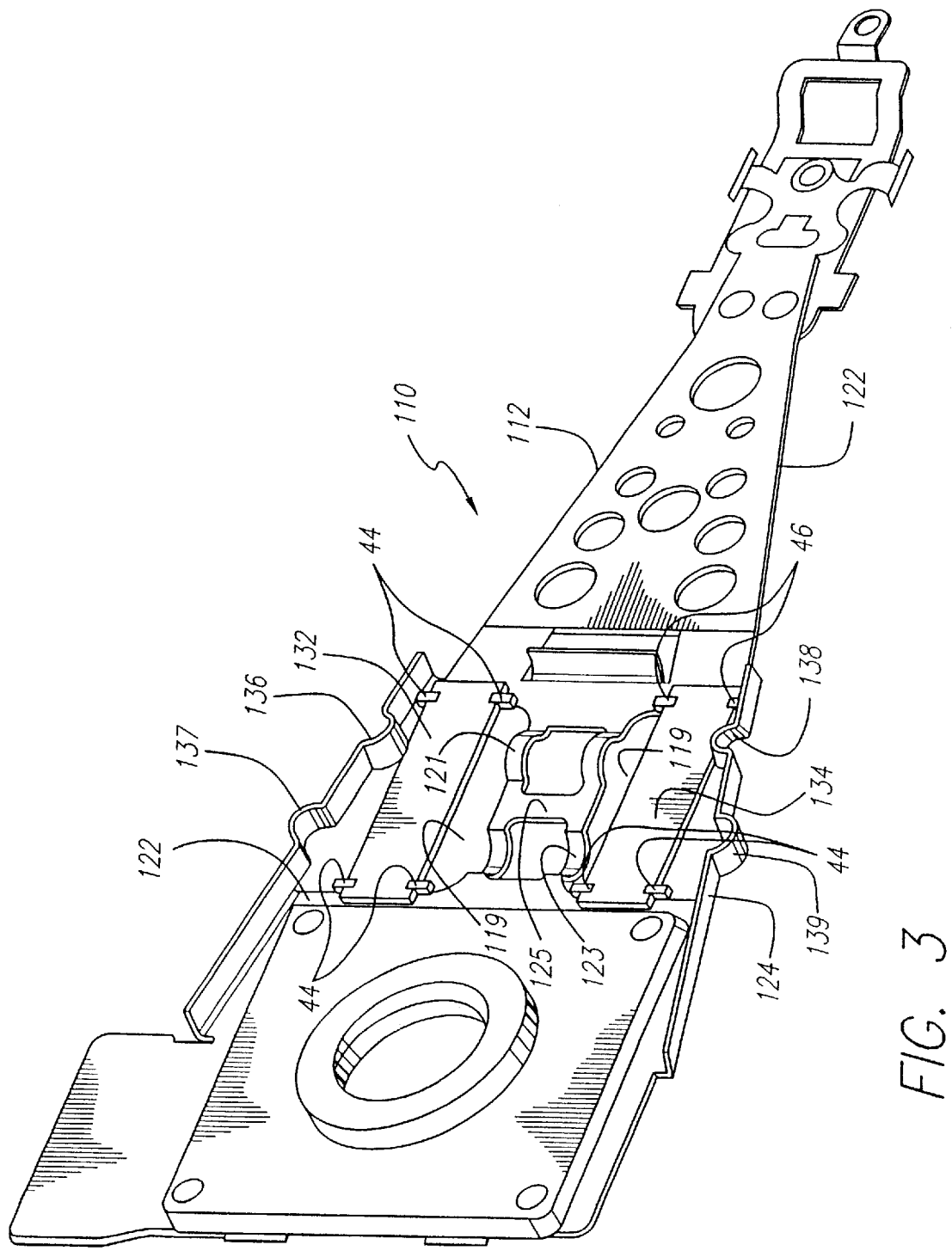
FIG. 3 is an oblique view of an alternate embodiment.

Further, a vertically disposed web, like spring elements 24, 26 in FIGS. 1–3, is softer in lateral stiffness than a horizontal web (no folding). The difference in stiffness is approximately the cube of the relative lateral dimension. Vertically disposed spring elements offer a decrease in lateral stiffness and an increase in vertical stiffness because the spring element is folded to lie on its side (face to the edge of the load beam) as opposed to having its face facing the face of the load beam. For example, for a 0.008 wide element made from 0.0025 thick spring steel the improvement from the orientation change is $(0.008/0.0025)^3$ or 32 times.

The invention with double arcuate section spring elements has the following performance in comparison with a single arcuate section spring element:

|  | STROKE SENSITIVITY (NM/VOLT) | $1^{ST}$ BENDING (HZ) | $2^{ND}$ BENDING (HZ) | $1^{ST}$ TORSION (HZ) | $2^{ND}$ TORSION (HZ) | SWAY (HZ) |
|---|---|---|---|---|---|---|
| SINGLE ARC DESIGN | 31 | 2523 | 4289 | 6000 | 11180 | 10548 |
| DOUBLE ARC IDEA | 41.2 | 2700 | 5277 | 6471 | 11606 | 10902 |

In FIG. 3, in which like parts have like numerals plus 100, an alternate embodiment is shown that uses positive interconnection of the load beam 110 and the crystals 132, 134. Specifically, the crystals 132, 134 each define a series of notches 44 arranged substantially at the corners of the crystals, and an interfitting series of tab elements or rails 46 formed by bending the load beam portions 18 and 22 at locations substantially opposite the notches during formation of the load beam. Thus coupled, the load piezoelectric crystals will act through the interfitting notch and rail structures, rather than through a lap-shear bond, to selectively displace the beam portion 22 relative to the base portion 18 so that the stress on an adhesive bond between the crystals and the load beam areas will be relieved.

The invention thus provides an improved suspension of novel design and a method of forming such load beams and suspensions wherein microactuators act against a beam spring portion having an improved expansion and contraction capability. Piezoelectric crystals act between the load beam base potion and the beam portion across the spring portion under voltages of less than about 40 volts to as little as 5 volts or less with an increased stroke sensitivity to greater than 40 NMNOLT through specially conformed spring elements bent from the plane of the load beam to be disposed vertically to the load beam to support the beam portion from the base portion and also to readily allow changes in dimension of the spring portion through the decrease or increase in repeating reversed arcuate sections of the spring elements.

The foregoing objects are thus met.

I claim:

1. A disk drive suspension comprising a load beam having a base portion, a spring portion extending in a plane and having right and left side rails extending normal to said spring portion and defining respectively opposed right and left spring elements that extend laterally of said load beam, and a beam portion adapted to carry a slider in operating proximity to a disk, a dimensionally variable piezoelectric crystal microactuator coupled to said base portion and said beam portion and across said spring portion in beam portion displacing relation to said base portion over a distance that is a function of an applied voltage to said microactuator and the resistance of said spring portion to changes in dimension, said left and right spring elements being longitudinally extended and multiply deflected at spaced locations along their longitudinal extent to form spaced proximate and distal local arcuate sections extending parallel to said spring portion plane and providing low resistance change in spring portion dimensions, said microactuator comprising right and left piezoelectric crystals inboard of said right and left spring elements, whereby said beam portion is displaced an increased distance at a given applied voltage.

2. The disk drive suspension according to claim 1, in which said proximate arcuate sections open inwardly.

3. The disk drive suspension according to claim 1, in which said distal arcuate sections open outwardly.

4. The disk drive suspension according to claim 1, in which said spring elements converge on one another from their proximate ends to their distal ends.

5. The disk drive suspension according to claim 1, in which said microactuator and said load beam define cooperating interfitting structures, said microactuator acting through said interfitting structures to displace said load beam.

6. The disk drive suspension according to claim 1, in which said right and left plezoelectric crystals have proximate portions attached to said base portion and distal portions attached to said beam portion, and intermediate portions between said proximate and distal portions, said arcuate sections being disposed opposite said crystal intermediate portions.

7. The disk drive suspension according to claim 6, in which said arcuate sections are each deflected a like amount from their respective spring elements, said piezoelectric crystals each have outer edges, and said distal arcuate sections are closer to said crystal outer edges than said proximate arcuate sections.

8. A disk drive suspension comprising a load beam having a base portion, a spring portion extending in a plane and having right and left side rails extending normal to said spring portion and defining respectively opposed right and left spring elements that extend laterally of said load beam, and a beam portion adapted to carry a slider in operating proximity to a disk, a dimensionally variable piezoelectric crystal microactuator coupled to said base portion and said beam portion and across said spring portion in beam portion displacing relation to said base portion over a distance that is a function of an applied voltage to said microactuator and the resistance of said spring portion to changes in dimension, said left and right spring elements being longitudinally extended and deflected at spaced locations along their longitudinal extent to form opposed local arcuate sections extending parallel to said spring portion plane and providing low resistance change in spring portion dimensions, said microactuator comprising right and left piezoelectric crystals opposite respectively said right and left spring elements, whereby said beam portion is displaced an increased distance at a given applied voltage.

9. The disk drive suspension according to clam 8, in which said suspension has a stroke sensitivity above about 35 NM/VOLT.

* * * * *